Sept. 2, 1958 P. L. ALISHOUSE 2,850,122

SPEED RESPONSIVE HYDRODYNAMIC BRAKE

Filed May 17, 1955

INVENTOR.
P. L. Alishouse
BY Arthur H. Sturges
Attorney

2,850,122
SPEED RESPONSIVE HYDRODYNAMIC BRAKE

Paul L. Alishouse, Idaho Springs, Colo.

Application May 17, 1955, Serial No. 508,938

2 Claims. (Cl. 188—183)

This invention relates to speed retarding devices for motor vehicles particularly of the type used for holding a vehicle on a long hill, such as traveling down a mountain highway, or retarding the speed of a motor or engine of a vehicle, and in particular a Hydrotarder, or hydraulic speed retarding device directly connected to the crankshaft of a motor or engine and provided with a clutch for operatively connecting the device to the crankshaft when use thereof is desired, and also with a governor that is coordinated with the retarding device for controlling the speed of the vehicle.

The purpose of this invention is to provide a hydraulic speed retarding device that is adapted to retard the speed of the motor or engine of a vehicle.

The hydraulic retarder, or Hydrotarder, of this invention is manufactured by the Parkersburg Rig and Reel Co., of Parkersburg, West Virginia, and this invention relates to the application of the Hydrotarder to the crankshaft of the motor of a motor vehicle.

Various types of braking devices have been provided for retarding the progress of motor vehicles, and particularly of large trucks, vans and trailers, on long down grades, such as sides of mountains, however, conventional devices for this use operate on the wheels or drive shaft, and it has been found that the efficiency of devices for this use can be greatly increased by applying the device directly to the crankshaft of the motor of the vehicle.

With this thought in mind this invention contemplates a hydraulic speed retarder that is adapted to be connected directly to the crankshaft of a motor vehicle, and that is provided with a clutch so that it may be connected to the crankshaft and disconnected therefrom at the will of the operator of the vehicle.

The object of this invention is, therefore, to provide means for connecting a Hydrotarder to the crankshaft of a motor of a motor vehicle whereby the R. P. M.'s of the crankshaft may be retarded as desired.

Another object of the invention is to provide a Hydrotarder assembly that is adapted to be installed in a motor vehicle and directly connected to the crankshaft of the motor thereof.

Another important object of the invention is to provide means for incorporating a governor in a Hydrotarder assembly for use in a motor vehicle wherein the speed is adapted to be controlled.

A further object of the invention is to provide means for connecting a Hydrotarder to a crankshaft of an internal combustion engine of any type for reducing the speed of the crankshaft.

A still further object is to provide a Hydrotarder assembly for use in a motor vehicle in which the device is adapted to be connected to the crankshaft of the motor of the vehicle and in which a clutch in the assembly is adapted to be operated by a pressure cylinder.

A still further object is to provide a hydraulic speed retarder for motor vehicles that is directly connected to the crankshaft of a motor of the vehicle in which the device is of a simple and economical construction.

With these and other objects in view the invention embodies a splined shaft adapted to be connected by a stub shaft and universal joints to a crankshaft of an engine, a Hydrotarder shaft aligned with the splined shaft and having splines positioned to mesh with the splines of the splined shaft, a Hydrotarder on said Hydrotarder shaft and having connections adapted to extend to the radiator of the vehicle, a clutch assembly for connecting the splined shafts, a cylinder for actuating the clutch of the assembly, and a governor for controlling the passage of fluid through the Hydrotarder for regulating the speed thereof.

Other features and advantages of the invention will appear from the following description taken in connection with the drawings, wherein.

Figure 1:
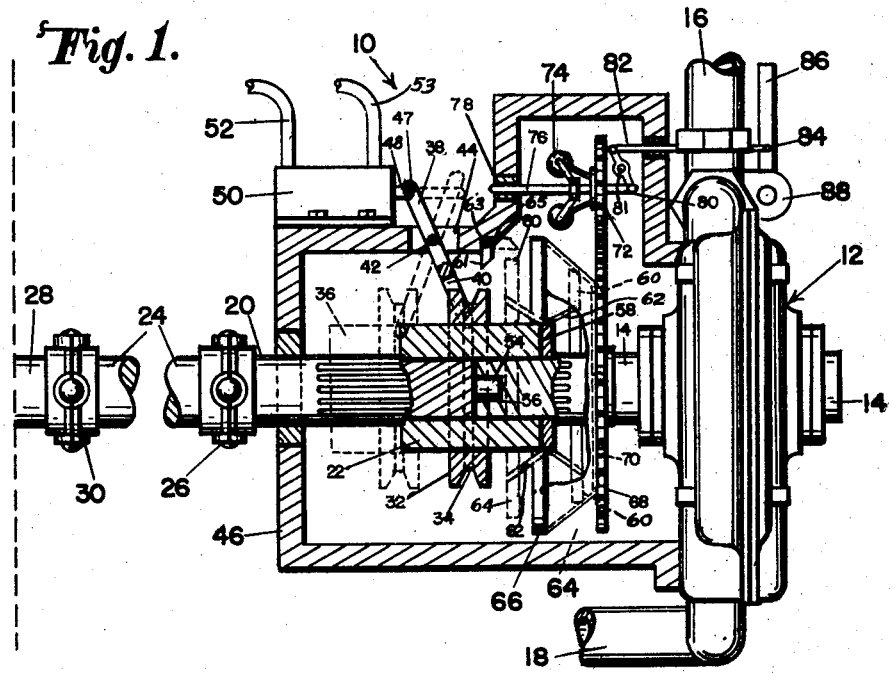
Figure 1 is a longitudinal section through the Hydrotarder assembly showing the device connected to the crankshaft of an internal combustion engine, parts of a connecting stub shaft being broken away.
Figure 2:
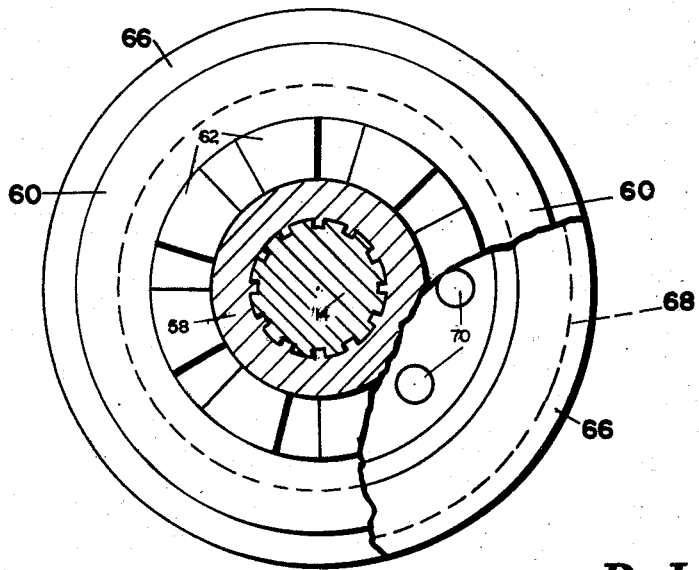
Figure 2 is a front elevational view of a clutch used in combination with the Hydrotarder showing a section through an internally threaded sliding collar and also through a splined shaft on which the collar is mounted.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a rotary hydraulic brake or pump such as a Hydrotarder which is mounted on a shaft 14 and provided with inlet and outlet connections 16 and 18, numeral 20, a splined shaft aligned with and abutting the shaft of the Hydrotarder, numeral 22 an internally splined clutch collar slidably mounted on the shaft 20, and numeral 24 a stub shaft connected to the shaft 20 with a universal joint 26 and to the crankshaft 28 of a motor or engine with a universal joint 30.

The clutch collar 22 is provided with a clutch ring 32 having an annular groove 34 therein and the ring and collar are integrally connected such as by a press fit and actuated from the position shown in full lines in Figure 1 to the position indicated by the dotted lines 36, and back to the full line position by a lever 38 having a conventional yoke 40 with inwardly extended pins on arms thereof, the pins being positioned to extend into the groove 34, and the lever being pivotally mounted by a pin 42 in a slot 44 of a clutch housing 46. The extended end of the lever is pivotally connected by a pin 47 to a piston rod 48 extended from a fluid pressure cylinder 50, whereby vacuum such as of the intake manifold of the engine, connected to opposite ends of the cylinder by tubes 52 and 53, actuates the piston in the cylinder to slide the clutch collar to engage the shaft 20 with the shaft 14, or to disengage the shafts, as may be desired. The shaft 20 is provided with a key or projection 54 that is positioned to extend into a socket 56 in the Hydrotarder shaft 14, whereby when the Hydrotarder is not in use the splined shaft 20 is free to rotate.

On the inner end of the collar 22 an inner ring 58 is secured, such as by brazing, and the ring 58 is connected to a friction ring 60 with inclined spring fingers or spokes 62 which suspend the friction ring beyond the end of the collar. With the collar 22 in the position shown in full lines in Figure 1 the ring 60 is positioned in a conical-shaped clutch bell 66, as indicated by the dotted lines 64, and as the collar 22 is withdrawn to the position indicated by the dotted lines 36 the ring 60 is also withdrawn to the dotted line position. The friction ring 60, therefore, provides means for connecting the shaft 20 and collar 22 to the gear 68 to which the clutch bell 66 is connected by screws or other fasteners 70.

The gear 68 is positioned to mesh with a pinion 72 which is connected by a governor 74 to a shaft 76 slidably mounted in a bearing 78 in the housing, and as the speed of a vehicle in which the device is installed increases with the engine of the vehicle substantially cut off balls of the governor 74 are thrown outwardly by centrifugal force sliding the shaft 76 longitudinally and gradually closing a valve 88 to which the shaft 78 is connected by a lever 80 and a rod 82, the extended end of which is connected by a pin 84 to a handle 86 of the valve. Upon closing the valve 88 the passage of fluid, such as water from the radiator of the engine, is restricted whereby the hydraulic brake or rotary pump or other device is retarded slowing down the rotation of the shaft 14.

Operation

In traveling down grade, such as down the side of a mountain, where an operator of a vehicle feels that it is necessary to retard the progress of a vehicle a control lever or button on the instrument panel may be actuated to supply vacuum to one end of the cylinder 50 whereby the cylinder actuates the yoke 40 to slide the collar 22 forwardly to engage the ring 60 with the bell 66 causing the Hydrotarder and its associated parts to begin to revolve until they turn at a speed sufficient for the splines of the collar 22 to become engaged with or mesh with the splines of the shaft 14. After successfully traveling down a grade vacuum is supplied to the opposite end of the cylinder 50 whereby the lever 38 is actuated to return the collar 22 and friction ring 60 to the positions shown in dotted lines in Figure 1. The bore of the sliding collar 22 is splined to correspond with the splines of the shaft 20 and also of the Hydrotarder shaft 14, and with the collar in the position shown in full lines in Figure 1, the shaft 14 is operatively connected to the crankshaft of the engine through the shaft 20. With the collar 22 in the position shown in dotted lines in Figure 1, the shaft 14 is disconnected from the shaft 20 except for the pin 54 in the socket 56.

The speed of the crankshaft 28 is reduced due to the resultant action of the gears 68 and 72, the governor 74, and the valve 88, which are coordinated to control the flow of fluid through the Hydrotarder 12, which operates as a rotary fluid brake, and thereby regulate the speed or R. P. M.'s of the motor or engine.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

1. In a hydraulic speed retarder, the combination which comprises a shaft having a splined surface adjacent one end, means for connecting the shaft to the crankshaft of a motor, a hydraulic retarding unit, a retarder shaft upon which the retarding unit is mounted, said retarder shaft also having a splined surface adjacent one end and being positioned in alignment with the shaft connected to the crankshaft, an internally splined clutch collar mounted on the shaft and adapted to extend over the splined portions of the shafts for connecting the shafts, a clutch ring mounted on one end of the clutch collar, a friction ring carried by the clutch ring, a clutch bell carried by the retarder shaft and positioned to be engaged by the friction ring, a fluid pressure cylinder, and means operatively connecting the fluid pressure cylinder to the clutch ring on the clutch collar.

2. In a hydraulic speed retarder, the combination which comprises a splined shaft, a stub shaft having universal joints on the ends for connecting the splined shaft to a crankshaft of an engine, a hydraulic retarding unit having a shaft with a splined surface adjacent one end, the shaft of the retarding unit being in abutting relation to the splined shaft and aligned therewith, an internally splined collar slidably mounted on the splined shaft and positioned to connect the splined shaft to the shaft of the retarding unit, a clutch ring mounted on one end of said collar, a housing in which the parts are mounted, a fluid pressure cylinder mounted on the housing, means operatively connecting the cylinder to the clutch ring and collar, a clutch bell positioned around the shaft of the retarding unit, a frictioning ring carried by spring fingers on the clutch collar and positioned to grip the clutch bell, a gear on the clutch bell, a governor positioned in the housing, a pinion on the governor positioned to mesh with the gear of the clutch bell, and means actuated by the governor for controlling the passage of fluid through the retarding unit.

References Cited in the file of this patent
UNITED STATES PATENTS

| | | |
|---|---|---|
| 1,187,596 | Anderson | June 20, 1916 |
| 1,625,543 | Hutchison | Apr. 19, 1927 |
| 2,044,999 | Smith et al. | June 23, 1936 |
| 2,055,297 | Lane | Sept. 22, 1936 |
| 2,438,157 | Dugas | Mar. 23, 1948 |
| 2,543,929 | Olman | Mar. 6, 1951 |
| 2,681,713 | Chambers | June 22, 1954 |
| 2,726,552 | Ringe | Dec. 13, 1955 |